Dec. 15, 1925.                                                                                   1,565,256
                                    J. H. CHRISTENSEN
METHOD OF PRODUCING PHOTOGRAPHIC COPIES BY MEANS OF PHOSPHORESCENT SUBSTANCES
                                    Filed July 30, 1920
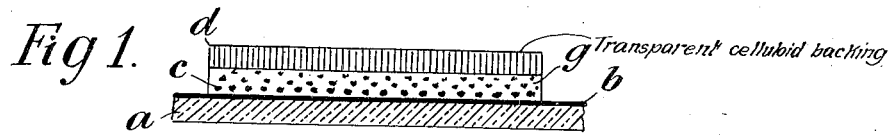
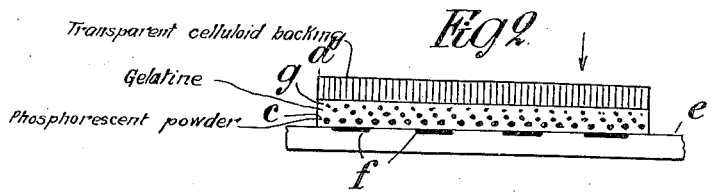
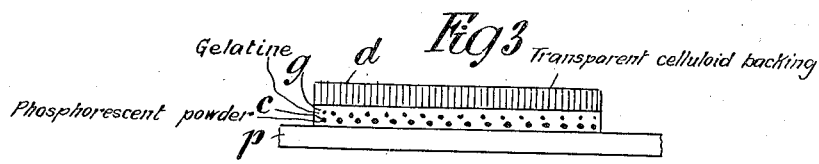
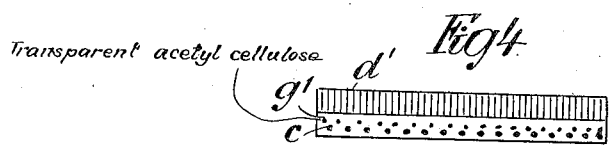
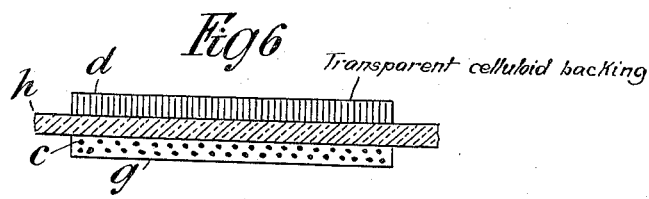
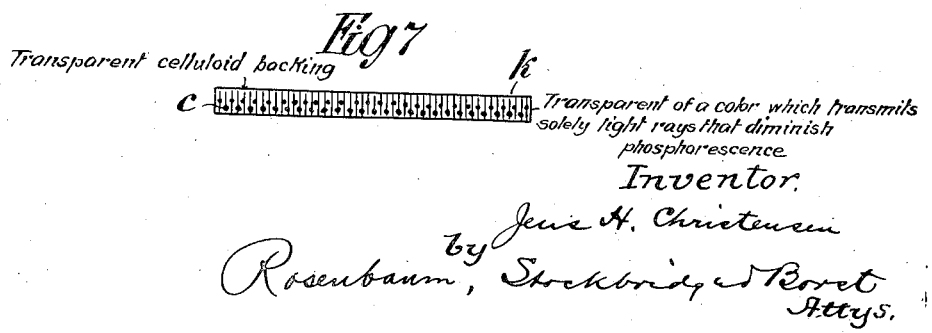

Patented Dec. 15, 1925.

1,565,256

UNITED STATES PATENT OFFICE.

JENS HERMAN CHRISTENSEN, OF HOLTE, DENMARK.

METHOD OF PRODUCING PHOTOGRAPHIC COPIES BY MEANS OF PHOSPHORESCENT SUBSTANCES.

Application filed July 30, 1920. Serial No. 400,232.

*To all whom it may concern:*

Be it known that I, JENS HERMAN CHRISTENSEN, a subject of the King of Denmark, residing at Holte, Denmark, have invented a new and useful Improvement in Methods of Producing Photographic Copies by Means of Phosphorescent Substances; and I do hereby declare the following to be a full, clear, and exact description of the same.

The invention aims at using phosphorescent substances in a special manner for the producing of photographic copies and is especially adapted for making copies from printed matters or from a positive paper picture.

Phosphorescent substances have already been used previously in photography. For instance it is known to use a plate coated with phosphorescent substances as a source of light for copying. It is also known that heat rays and red or yellow light diminish the phosphoresence, and this effect has also been seen to take place upon exposure in a camera of such a phosphorescent plate with the use of a red light filter.

In the accompanying drawing—

Fig. 1 shows diagrammatically how a film in accordance with the invention can be made, Fig. 2 the film in contact with a picture to be copied, Fig. 3 the film in contact with a sensitive paper sheet and Fig. 4-7 illustrate different manners in which the phosphorescent layer and the colored layer can be combined.

The present invention can be carried into effect for instance in the following manner: A phosphorescent substance, for instance Balmain's powder or so called Sidot-blende is carefully comminuted. Balmain's powder is a phosphorescent calcium sulphide and Sidot blende is a phosphorescent zinc sulphide. The phosphorescent properties of these substances are believed to be due to a small content of certain impurities. The comminuting is preferably effected by the mixture of some of the powder with a liquid such as water and shaking for several hours in a bottle containing glass balls. A special uniform comminuting is effected in this manner. The mixture produced is mixed with a gelatine solution and some glycerine to a suitable consintency and poured out on a glass plate $a$, (Fig. 1) which has been provided with a thin covering $b$ of rubber. The gelatine $g$ soon solidifies, but before this has taken place a small quantity of the powder $c$ has settled to the bottom, and on the surface facing the glass the powder is especially dense and evenly distributed.

After the said covering has been dried a solution of celluloid or collodion $d$ which has been dyed, for instance red, yellow, or any color which will transmit a light capable of breaking down or diminishing phosphorescence is poured over and likewise dried. Thereafter the gelatine film and celluloid film together are torn off the glass plate which can easily be done owing to the rubber coating, and a red film carrier covered with a phosphorescent layer of specially good qualities is obtained.

This sheet is illuminated, firstly from the gelatine side containing the powder $c$, for instance during some minutes by a 100 candle lamp, or by day light, whereby the powder is caused to phosphoresce. Thereafter the phosphorescent surface is laid against the picture or printed matter $e$, (Fig 2) to be copied and is illuminated through the red film and through the phosphorescent layer towards the paper as indicated by the arrow. The red illumination will, as stated, destroy the phosphoresence, and it has been proved that it destroys the phosphorescence especially where the light strikes and is reflected by the white paper, but in less degree where the light strikes and is absorbed by the letter types $f$ or the like. After this illumination the phosphorescent plate or sheet $d$, $g$, $c$ is taken off and laid on a light sensitive paper $p$ (Fig. 3), for instance silver bromide paper, where through phosphorescence it produces a latent positive picture which can be developed in known manner.

Instead of, as above named, placing the phosphorescent substance in a gelatine film, it can as well be distributed in a collodion or lac film, $g'$, Figure 4 and also the colored layer $d'$ may consist of some other colloidal substance than nitrocellulose, for instance acetyl cellulose.

If a solid nonflexible plate is desired, both layers can be poured out on a glass plate $h$ either on top of each other Fig. 5, or one on each side of the same Fig. 6.

Also the two layers $d$ and $g$ may be combined into one layer $k$, Fig. 7, if a dye be added to phosphorescent substance, so that the phosphorescent layer becomes colored and acts itself as a light filter.

Having thus fully described my invention I claim as new and desire to secure by Letters Patent:

1. The method of copying by means of a phosphorescent screen, which comprises illuminating a phosphorescent film, placing the said screen in contact with a picture to be copied, illuminating the picture through the screen with a colored light which will diminish the phosphorescence, then placing together the phosphorescent screen and a light sensitive film to produce on the latter a latent picture corresponding to said picture, and then developing the light sensitive film.

2. The method of copying by means of a phosphorescent screen, which comprises applying to a surface a translucent film containing comminuted phosphorescent material, applying to the first film another translucent film containing a dye which will transmit a light having the property of diminishing phosphoresence, removing the combined films from the surface, illuminating the combined films from the side having the first film to cause the comminuted material to phosphoresce, placing together the combined films and a picture to be copied with the first named film facing the picture, illuminating the first film and picture through the second film, removing the combined films and placing them together with a light sensitive film with the first film facing the light sensitive film to produce on the latter a latent picture corresponding to said picture and then developing the light sensitive film.

3. The method of copying by means of a phosphorescent screen, which comprises directly illuminating a screen containing a phosphorescent material, placing together this screen and a picture to be copied, the phosphorescent layer being in contact with the picture, illuminating the picture through the screen with light rays having the property of diminishing phosphorescence, then placing together the phosphorescent screen and a light sensitive film to produce on the latter a latent picture corresponding to said picture, and then developing the light sensitive film.

4. Material for carrying out the method mentioned in claim 1, consisting of a translucent sheet containing a phosphorescent substance which is most concentrated on the side intended to be brought in contact with the picture to be copied.

In testimony whereof I have affixed my signature.

JENS HERMAN CHRISTENSEN.